(12) United States Patent
Gauthier

(10) Patent No.: US 12,240,575 B2
(45) Date of Patent: Mar. 4, 2025

(54) VIRTUAL REALITY SPORTS MASK WITH PRECISION THREE-DIMENSION UNDERWATER NAVIGATION

(71) Applicant: Tesseron LTD, Key Largo, FL (US)

(72) Inventor: Forrest P. Gauthier, Homestead, FL (US)

(73) Assignee: Tesseron Ltd., Key Largo, FL (US)

( * ) Notice: Subject to any disclaimer, the term of this patent is extended or adjusted under 35 U.S.C. 154(b) by 18 days.

(21) Appl. No.: 16/406,778

(22) Filed: May 8, 2019

(65) Prior Publication Data

US 2020/0132463 A1 Apr. 30, 2020

Related U.S. Application Data

(60) Provisional application No. 62/673,202, filed on May 18, 2018.

(51) Int. Cl.
| | | |
|---|---|---|
| *B63C 11/12* | (2006.01) | |
| *G01C 21/16* | (2006.01) | |
| *G06F 3/01* | (2006.01) | |
| *G02B 27/01* | (2006.01) | |
| *G06T 11/00* | (2006.01) | |

(52) U.S. Cl.
CPC .......... *B63C 11/12* (2013.01); *G01C 21/1654* (2020.08); *G01C 21/1656* (2020.08); *G06F 3/01* (2013.01); *B63C 2011/121* (2013.01); *G02B 2027/0138* (2013.01); *G02B 2027/0141* (2013.01); *G02B 27/0172* (2013.01); *G06T 11/00* (2013.01)

(58) Field of Classification Search
CPC .......... G01C 21/165; B63C 11/12; G06F 3/01
See application file for complete search history.

(56) References Cited

U.S. PATENT DOCUMENTS

| | | | | |
|---|---|---|---|---|
| 7,310,063 | B1* | 12/2007 | Brown | B63C 11/26 342/357.75 |
| 2012/0022820 | A1* | 1/2012 | Schmitz | G01C 21/165 702/95 |
| 2012/0235902 | A1* | 9/2012 | Eisenhardt | G06F 3/017 345/156 |
| 2016/0055640 | A1* | 2/2016 | Menozzi | G02B 27/0093 345/633 |
| 2019/0311539 | A1* | 10/2019 | Hogue | H04L 67/306 |

\* cited by examiner

*Primary Examiner* — Matthew Salvucci
(74) *Attorney, Agent, or Firm* — MacMillan, Sobanski & Todd, LLC

(57) ABSTRACT

A sports mask is disclosed that includes either: a snorkel and a SCUBA unit; a color underwater camera; a 3D color underwater camera; an augmented reality display projected onto the lens; a co-axial breathing hose-to-scuba unit; computerized underwater navigation; non-GPS computerized underwater navigation; a computerized navigation system that combines visual edge recognition and inertia navigation; an optical transponder; or RF communications.

14 Claims, 13 Drawing Sheets

VIRTUAL REALITY SPORTS MASK WITH PRECISION THREE-DIMENSION UNDERWATER NAVIGATION

CROSS-REFERENCE TO RELATED APPLICATIONS

This application claims the benefit of U.S. Provisional Application No. 62/673,202, filed May 18, 2018, the disclosure of which is incorporated herein by reference.

BACKGROUND OF THE INVENTION

This disclosure relates to sports masks, apparatuses and methods to determine an earth-oriented device location and series of locations in three dimensions, a lens line-of-sight orientation in azimuth and altitude relative to the device location, methods for matching the current three dimension location to desired routes and destinations, methods for communicating the current location and other data to other devices, methods for receiving data from other devices, methods for capturing visual features from the real world environment and identifying the features, and methods for making the location, orientation, visual features, and other data available to software. The software then providing a translucent digital image on a lens over the real-world environment in the line-of-sight of the user.

Sports masks are used in a variety of recreational and competitive activities, such as snow sports, biking, snorkeling, and underwater diving. While this disclosure describes a full face sports mask for snorkeling and diving, this invention is applicable to other types of activities as well.

Sports masks are different from a direction-oriented vehicle, as the user has a geographical location in the three axes of XYZ, as well as a line-of-sight visual orientation of azimuth and altitude relative to the geographical location. Body movement vectors are often different from visual orientation vectors, as sports activities often have the body moving in a different direction than the person is looking. In snow sports, one may be sliding down hill while looking across the hill. In the water, the current may be moving one in a different direction all than the direction he or she is looking.

The traditional Geographic Coordinate Systems provides a navigation fix of degrees of latitude and longitude with no altitude or depth information. The Global Position System (GPS) uses the Geographic Coordinate System and the WGS84 datum. This works well for navigation in two dimensions, yet falls short for three dimensions. A GPS altitude can be calculated from the orbital reference to the geode, but this value is inaccurate and unreliable for navigation in three dimensions. All aircraft using GPS must use pressure altimeters that are recalibrated prior to every landing in order to get accurate altitude information. While radio navigation and GPS is very useful for ten meter surface locations, one hundred meter altitude resolution falls very short for the needs of adventure sports navigation. As soon as one engages in underwater sports, no radio or GPS navigation is possible at all.

For many adventure sports, traditional geographic coordinate systems are not sufficient to provide rapid and accurate navigation in three dimensions. Radio navigation, like GPS, even when available, will not provide an accurate three dimension location for activities such as following a snow trail through forested areas, mountain biking a narrow trail, or any underwater sports activity. Compounding the problem, radio navigation completely fails underwater as the signals are quickly attenuated by water, and may fail in heavy wooded areas or steep mountain sides.

The earth-centered, earth-fixed (ECEF) coordinate system defines a numerical expression of location in meters based on the center of the earth and aligned with the international reference pole and the international reference median. The numerical values of the ECEF (X, Y, and Z) axis define a precise location in three dimensions of any location below, on, or above the earth surface, including precise altitude and depth at the standard one meter resolution. Current radio based navigation systems are unable to provide a highly accurate ECEF or equivalent three dimension location, and even the ECEF standard is lacking due to its one meter resolution.

Activities such as snorkeling, diving, mountain biking, and snow sports often benefit from the information provided by computer software, yet presenting this information in a usable way to the users while engaged in the activity is complex. Heads-up and near-eye displays have been developed and are somewhat effective. However, such heads-up and near-eye displays cannot incorporate environmental features into the displayed information.

Current art heads-up and near-eye displays for sports masks cannot provide the user with context-based information or virtual controls, as they lack the ability to detect user head movement or the visual and sensor recognition of dynamic features in the environment.

The magnetic compass was first invented during the Chinese Han Dynasty, then later adopted for navigation by the Song Dynasty Chinese during the 11th century. The magnetic flux of the earth is still a good way to determine position to the magnetic north and works well underwater and in areas where radio navigation fails. However, a magnetic compass can only provide a direct line position to the magnetic north pole, making it unusable for determining a multi-axis navigation fix.

Early Pacific Polynesians used the motion of stars, weather, and even the size of waves to find the path from one island to another. Navigation using scientific instruments, such as the mariner's astrolabe (a primitive celestial navigation device) first occurred in the Mediterranean during the Middle Ages. While celestial navigation was a significant improvement over reckoning, it cannot provide a constant fix or a fix in rugged terrain or underwater.

Most navigation techniques rely on the crossing points of estimated lines or circles of position to determine a position fix. Modern navigation relies primarily on positions determined electronically by radio receivers collecting lines or circles of position from satellites or fixed land based transmitters, such as GPS or the very high frequency omni-direction radio range (VOR) system for aircraft.

Inertial navigation is a navigation method that uses a computer, motion sensors, rotation sensors, and occasionally magnetic sensors, to continuously calculate the position of a moving object without the need for external references. Inertial navigation was originally developed for rockets by American rocketry pioneer Robert Goddard.

All inertial navigation systems suffer from integration drift, which is small errors in the measurement of acceleration and angular velocity. This error is then integrated into progressively larger errors in velocity, which are compounded into still greater errors in position. Since the new position is calculated from the previous calculated position and the measured acceleration and angular velocity, these errors accumulate roughly proportionally to the time since the initial position was input. Therefore, the position must be periodically corrected by input from some other type of navigation system. While very expensive sensors, such as ring laser gyroscopes, reduce this error, the low cost Micro-ElectroMechanical (MEMS) sensors preferred in consumer devices compound the errors.

Vision-based navigation or optical navigation was first pioneered in the 1980's for robotics. It uses computer vision algorithms and optical sensors, including laser-based range finder and CCD or CMOS cameras, to match visual features stored in a memory to the image of the surrounding environment. Increases in computing power and algorithms have now allowed vision navigation using feature mapping and vector movement calculation. However, feature-based vision navigation still falls short with rapid movements and lacks the ability to determine a known latitude/longitude, altitude, depth, or the correct azimuth.

Estimation theory in general, and Kalman filtering in particular, provide a theoretical framework for combining information from various sensors such as radio, inertia, gyroscopic, magnetometers, and vision feature recognition, to work together to create a true three dimensional navigation system.

Full face diving masks were first used in 1828. This rigid helmet fit over the diver's head and shoulders, with breathing gas supplied from the surface. This technology, with varying modifications and improvements, was used through the mid-1900s for salvage work, commercial diving, ship husbandry, and other professional diving applications. Improvements included safety additions such as check valves and volume controls, communication capability, helium serviceability, gas reclamation and recycling, and exterior mounted cameras. Dive helmets differ from full face masks in that they are completely rigid, usually fabricated from metal, and often mate to the diving dress (exposure suit). Manufacturers include Diving Equipment and Salvage Company (DESCO), Kirby-Morgan Dive Systems, Sea Trek, Morse Diving Equipment Company, A Schrader's Son, Miller-Dunn Diving Company, and others.

Band masks are an adaptation of the dive helmet, in that the rigid shell is replaced by a lightweight pliable structure to which a face plate is attached. Additional support and retention is enhanced by broad bands or straps attached to the mask frame. Typically, demand regulators, equalizing devices, oral nasal enclosures, and communications capability are incorporated into such masks. They are generally used by professional divers in commercial diving applications. Band masks differ from full face masks in that they still enclose the entire head, are generally heavier, provide additional cranial protection, and are more robust. The world's leading supplier is Kirby-Morgan Dive Systems.

The first full face mask was invented in 1933 by Yves Le Prieur. After inventing the first self-contained breathing apparatus for underwater work, the mask was a later improvement designed to prevent mask squeeze. Full face diving masks were later adapted for use in surface supplied and closed circuit apparatus. DESCO was an innovator in full face masks beginning in 1937 and continuing to the present. Lightweight, full face diving masks are used in both commercial and recreational diving arenas. Modifications have included externally mounted cameras, near eye displays (heads up displays, or HUDs), oral nasal enclosures, incorporated snorkels, incorporated demand valves, removable pods for breathing systems, and others. Leading manufacturers include Diving Equipment and Salvage Company (DESCO), Kirby-Morgan Dive Systems, Ocean Technology Systems (OTS), Scubapro, Drager, and Ocean Reef. This disclosure will present an improvement over the present art of face masks and new inventions that add desired functions and solve problems inherent in the current art.

Water is transparent to the wavelengths of electromagnetic radiation that fall within the visible spectrum, and is opaque to wavelengths above and below this band. However, once in the water, visible light is subject to both refraction and attenuation. Underwater visible light communication (UVLC) is therefore limited due to the attenuation effects of seawater to visible light. In 1963, S. Q. Duntley proposed that seawater shows a relatively low attenuation property to light with wavelengths from 450 nm to 550 nm. However, low cost solid state sources in this wavelength were not available until recently. In 2016, C. Wang demonstrated that it is possible to achieve LED-based visible light communication over a link distance of 500 m *in* pure seawater by employing a single photon avalanche diode. Currently, only a few limited products have been commercialized, such as the BlueComm system (which claims 20 Mbps data transmission rate over a point-to-point distance of 200 m) and the Ambalux system (which claims 10 Mbps data transmission rate over a point-to-point distance of 40 m).

A diffused light UVLC configuration employs diffused light sources, such as LEDs, with large divergence angles to accomplish broadcasting data from one node to multiple nodes. Broadcasting removes the requirement of precise point-to-point aiming of the devices. However, compared with the point-to-point configuration, the diffused-light based link suffers from greater aquatic attenuation. Relatively short communication distances and lower data rates are the two major limitations of this configuration.

In 2011 Harald Haas coined the term Li-Fi. In October 2011, companies and industry groups formed the Li-Fi Consortium to promote high-speed optical wireless systems. Like Wi-Fi, Li-Fi is wireless and uses similar 802.11 protocols, but modulates infrared and visible light for communications in place of radio waves.

SUMMARY OF THE INVENTION

The current disclosure provides several inventions associated with a sports mask. For the purpose of the current disclosure, a sports mask is any recreational, hazardous-duty, low-atmosphere, or no-atmosphere use mask or helmet that has a transparent (sufficiently transparent to see through by a user) face-plate or eye-plate (also referred to herein as a lens) connected or mounted to a head-support structure, such as a head harness, a helmet, a head-band, and the like.

For example, and without limitation, this disclosure teaches a device and methods to determine a three dimension earth centered ECEF position of a sports mask. The current disclosure also provides: (1) a device and methods to determine the relative orientation of the line-of-sight of the lens of the sports mask in relative azimuth and altitude of the ECEF location of the mask; (2) a method for matching the current three dimension location of a sports mask to desired routes and destinations; (3) a method for displaying a desired virtual path over a real world image; (4) a device and method for communicating the current location and other data to other sports masks and receiving data from the other devices; (5) a device and method for capturing visual features from the real world environment and identifying the features; (6) a device and method for making the location, orientation, visual features and other data available to software; (7) a device and method for the software then providing a translucent digital image on a lens over the real-world environment in orientation of line-of-sight of the user in a sports mask; and (8) a sports mask having one or more sources of breathing gas. When enabled with two sources of breathing gas the mask may provide automatic switching between the sources when enabled to do so.

This disclosure also teaches a novel navigation system for sports masks that calculates an enhanced relative ECEF three dimension location fix that is calibrated to absolute ECEF coordinates using a known radio latitude, longitude, and altitude (LLA) fix and a magnetic azimuth to orient the fix to the real WGS84 datum. This XYZ axis location fix is modified using three axis inertia/acceleration, gyroscopic data, and vision vector calculation. The orientation of the line-of-sight lens of the mask is also calculated relative to the location of the mask in two axis of azimuth and altitude. The vision system detects and extracts edges and features from the environment and compares frames to establish movement of the features. The system then computes three dimension vectors based on changes in the movement of the features. Filtering is used to mix the data from the sensors into an relative XYZ position and, at some time, this relative position is adjusted to the WGS84 datum. The navigation solution and lens orientation is then incorporated with other data and context-sensitive computer data and is combined and displayed in a translucent video overlay on the face plate of the sports mask.

The displayed information is context-sensitive, as the software responds to features in the environment detected by the vision system and to the sensors detecting the user's movement, location, and situation.

Desired routes and or destinations stored as one or more enhanced ECEF coordinates and arrays of coordinates are compared to the calculated location to provide guidance to the user. This guidance is displayed in an overlay of the real world image corrected to the mask altitude and azimuth orientation.

The underwater version of the mask provides a novel design incorporating one or more breathing gas sources. The breathing gas source incorporates separate paths for inhale and exhale gas to reduce the volume of exhaled gas re-inhaled by the user. A dual-port, surface-supplied snorkel with an automatic closure valve is fixed to the top of the mask. A co-axial convoluted hose may be connected to the oronasal cup in the bottom portion of the mask, which is fluid coupled to a surface supplied power snorkel or a self-contained underwater breathing device.

A short range, defused-light broadcast optical communications system in the mask broadcasts and receives information to and from other devices. This information is then incorporated into the digital data of the augmented display to indicate the location and identity of other users.

Provision for one or more data gathering sensors is provided through a digital serial interface. The sensors are part of the Citizen Scientist program to crowd-source ocean research data for the Marine Resources Development Foundation and other research groups. The data from the sensors is combined with the navigation and time data of the mask to provide high-volume, crowd-sourced research data to better understand and protect our ocean.

A short range radio link or optical link wirelessly connects the mask with a smartphone device and with special application software to record the audio/video stream from the on-board camera and microphone. This video stream is tagged with the time/location/feature/ideogram metadata in three dimensions from the mask's navigation system.

Various aspects of this invention will become apparent to those skilled in the art from the following detailed description of the preferred embodiments, when read in light of the accompanying drawings.

DETAILED DESCRIPTION OF THE PREFERRED EMBODIMENT

Figure 1:
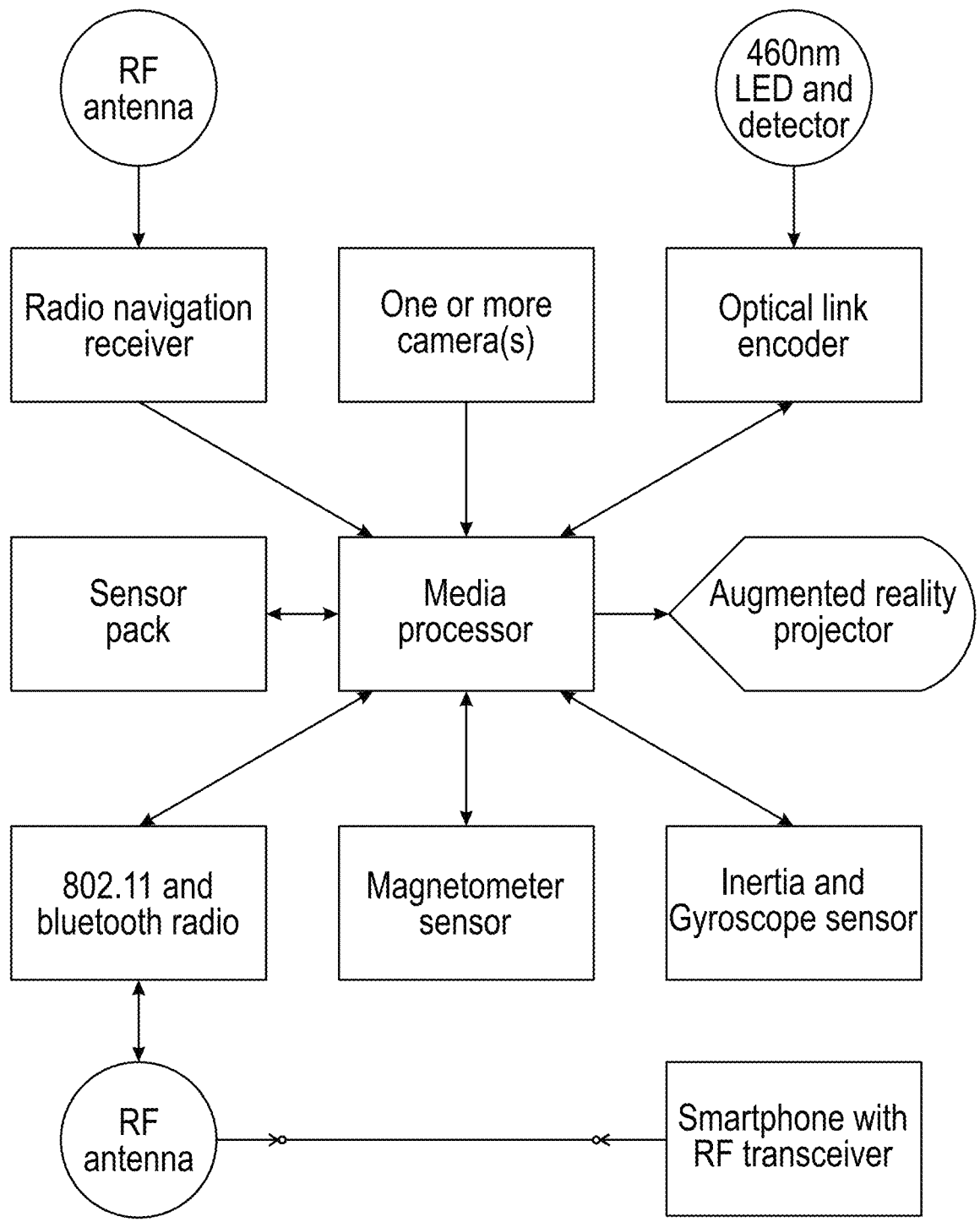
FIG. 1 is a block diagram of a first embodiment of a virtual reality sports mask system in accordance with this invention.

The Pneuma mask is the platform for an augmented reality user interface and incorporates a processing unit, navigation and orientation system, microphone, sensors, display, optical communications, and short range RF communications. The mask may contain one or more of an array of low-cost sensors, including video cameras, inertia/acceleration sensors, gyroscopes, magnetic sensors, GPS receiver, microphone, and tactical buttons. One or more cameras are mounted in the mask to record the environment and to provide the feed to the feature detection navigation, virtual reality routines, and the video image stream. A microphone/hydrophone may be mounted near the oral-nasal cup to record user and ambient sounds. A three-axis micro-machined silicon accelerometer and gyro (MEMS) make up the inertia measurement unit (IMU) and are used for movement detection. A multi-channel radio navigation receiver (GPS) is used to acquire a terrestrial fix prior to and/or after immersion. A three-axis magnetometer sensor is used for detection of magnetic azimuth. A short wavelength optical transmitter and receiver and a 2.4 GHz RF transceiver are incorporated for communications. All of the sensors are used for the navigation routines and for the movement and environment input to the augmented reality software and display.

Mask Design and Virtual Reality Display

The dive version of the mask is a polymer full-face mask with a liquid silicone molded face seal and oral-nasal cup, polymer full face lens, co-axial supply hose, ambient air snorkel, electronics, display, sensors, and the forward looking cameras. The mask has an oral-nasal cup to help control fogging of the mask from moist exhaled gas, allow underwater breathing through the mouth and nose and to reduce the inhalation of exhale gas.

The mask has an azimuth and altitude orientation of the line-of-sight through the lens that is relative to the device ECEF location. This orientation vector is used to select content for the digital image overlay. The lens orientation consists of a 360° azimuth angle rotating about the ECEF Z axis, with zero at the X axis and an altitude above and below the horizontal X axis with zero parallel to the north Z axis and 180° parallel to the south Z axis. The values are relative, as the center point moves with the ECEF location of the mask.

Several display technologies have been developed to help determine the most practical one for the mask, including a 4D Systems TOLED (translucent OLED) display, a prismatic cut side projector display, and a direct reflecting vapor deposition display. The first method has a laminated translucent OLED display fixed to the inside of the lens. Another method has a vapor-deposited coated optical surface on the lens to reflect the image from an emissive projector. It is possible to use OLED, micro-LED, and TFT technologies for the projector. The current display is the DD-9664FC-2A organic light emitting diode OLED display from Densitron. The display is 25.7 mm×22.2 mm×1.5 mm with an active area of 22.14 mm×15.42 mm, with 65,536 colors. The display is connected to a Solomon Systech SSD1331 single chip display driver. The display driver is connected to a Cortex M4 MPU using an eight bit parallel interface. The display is driven inverted and reflected off the inner surface of the vapor deposition coating of the lens.

In one configuration, the media processor in the mask drives the faceplate display and collects the data from the sensors. The sensor data is transmitted over the RF or optical link to the primary application processor in a smartphone, with graphic content then sent back to the mask processor again through the RF or optical link. In the mask are one or two board level Chicory CBAC819, Q-Technologies F3M2YAP, or GSEO GS-8848 4P 1080p color camera(s) connected to the dual MIPI CSI-2 interface to a 800 MHz i.MX515 Cortex-A8 media processor. Also in the mask is the TDK MEMS I$^2$C MPU-9250 combined inertia, gyro, and magnetometer sensors, which send data to the I$^2$C port on the Cortex media processor, which may then send the data to the smartphone.

The mask has several configurations for the electronics packaging. Depending on feature and price points, the primary functions of the mask are the same in the various configurations.

In one configuration, all of the electronics and sensors are mounted in the mask, with an RF link to a smartphone (or some other mobile computing device as is known in the art, such as a tablet computer, laptop computer, smart watch, and the like). The smartphone configures the mask on the surface and downloads the data from the mask after the mask is returned to the surface. The smartphone does not need to be submerged with the mask (see FIG. 1).

Figure 2:
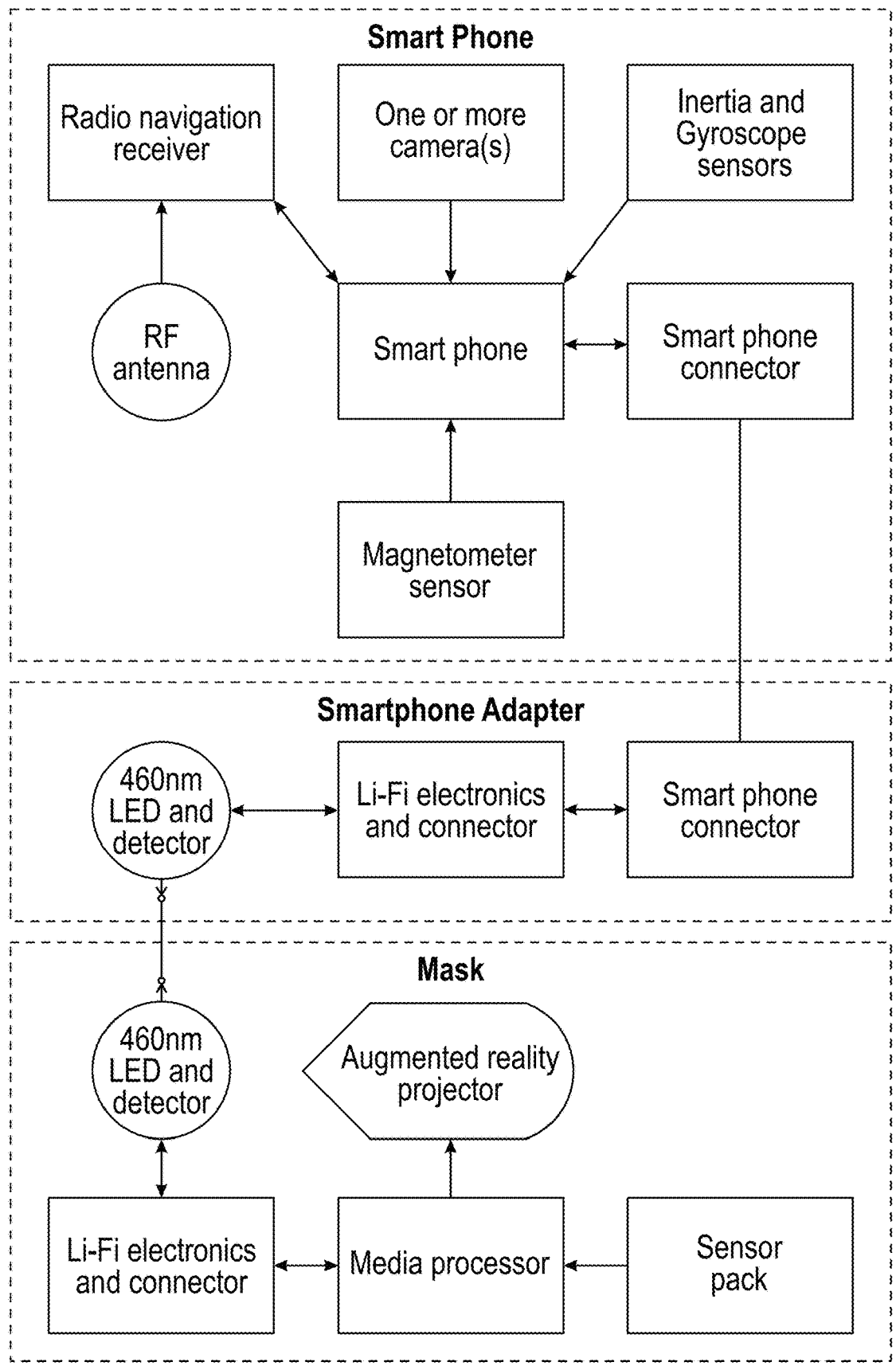
FIG. 2 is a block diagram of a second embodiment of a virtual reality sports mask system in accordance with this invention.

In another configuration, the camera, display projector, and media processor are mounted in the mask. The mask then sends data using an RF or LiFi link to the smartphone. If the optical link is used, the smartphone has an optical transceiver or an optical adapter connected to the data port. The smartphone does the primary processing and send the video image back to the mask. The sensors and most of the functions are performed in the smartphone. The smartphone is submerged with the mask (see FIG. 2).

Figure 3:
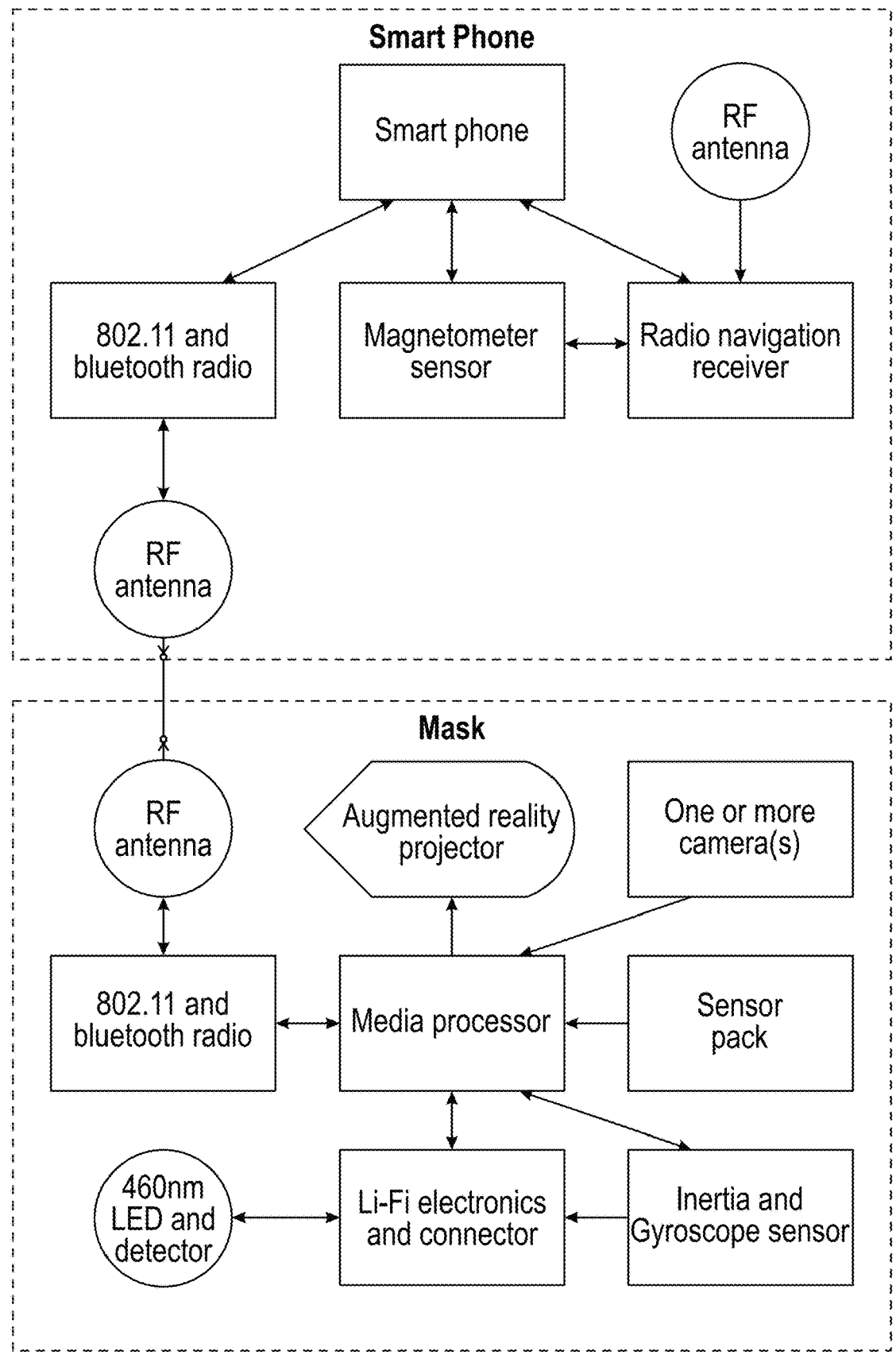
FIG. 3 is a block diagram of a third embodiment of a virtual reality sports mask system in accordance with this invention.

In another configuration, the camera, display and inertia sensors are located in the mask, sending data to the smartphone over a RF or Optical link. The mask maintains a link with the smartphone using the LiFi or RF link to send data including the display data back to the mask. If using the optical LiFi mode, a transceiver is attached to the smartphone data port. The smartphone configures, monitors, and operates the mask during the dive. The smartphone is submerged with the mask (see FIG. 3).

As can be seen, the location of sensors, processors, or other devices is not critical to the functions performed with the mask, and various implementations of the design are possible. For example, it will be appreciated that any of the smartphone processing and/or mask processing described above may be performed by a processor(s) contained in the mask or in associated recreational and/or hazardous duty equipment worn by, or carried by the user (such as, for example, breathing apparatus equipment). It will also be appreciated that the masks described above may be implemented as other types of sports masks as described herein (not necessarily diving masks).

A battery, media processor, and 802.11 and L2CAP radios in the mask drives the faceplate display and collects the data from the sensors. The sensor data is transmitted over the RF link to the primary processor application, with graphic content sent back to the mask processor again through the RF link. One or two board level Chicory CBAC819, Q-Technologies F3M2YAP, or GSEO GS-8848 4P 1080p color camera(s) are connected to the dual MIPI CSI-2 interface and to a 800 MHz i.MX515 Cortex-A8 media processor. A TDK MEMS I$^2$C MPU-9250 is used for the combined inertia, gyro, and magnetometer sensor data.

Figure 4:
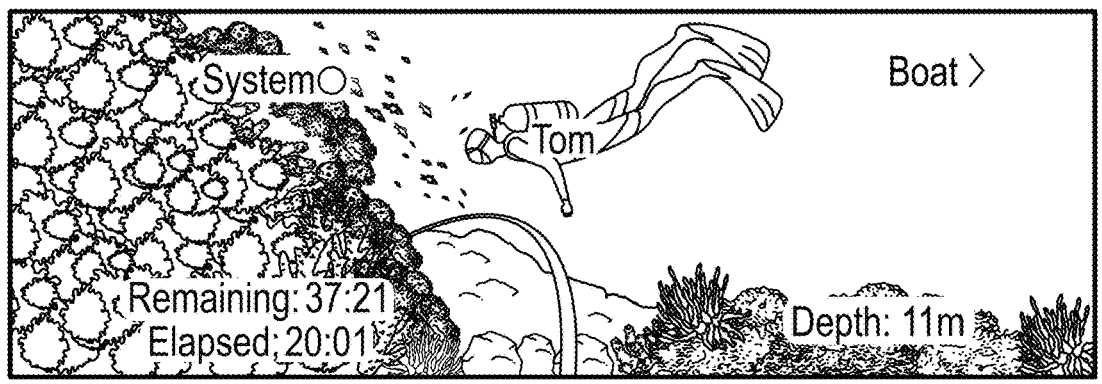
FIG. 4 is an exemplary representation of a view through the virtual reality sports mask.

The dive version of the mask displays (i.e., projects on the lens) four primary groups of information, the dive, the machine, the user, and navigation. Dive information contains the depth, time in the dive, and time remaining for the dive. The machine information contains the go/no-go status of the machine. The user information contains the suggestions and warnings. The navigation display is 3D and guides the user to places of interest, routes, and shows the exit direction and distance (see FIG. 4).

In certain embodiments, the Dive information is always visible. The Machine information has a color and shape indicator for status. The user information may include suggestions to user behavior, such as to slow the ascent, slow breathing, increase breathing, relax, have fun, and the emoji marker.

In certain embodiments, the navigation section has at least the functions below:

the 3D direction and distance to the way-out;

the 3D direction and distance to target destination(s) and routes;

the 3D indicator of other Pneuma users; and an option to display the historic breadcrumb path.

Multiple Breathing Gas Sources

To reduce the volume of exhale gas that may be re-inhaled by the user, the mask uses separate ports for the inhale and exhale gases and an oronasal cup. Multiple sources of breathing gas may be available to the user of the mask depending on the configuration. One source is surface supplied air through a short snorkel, another using a surface supplied powered snorkel and another from a self-contained underwater breathing apparatus.

Figure 5:
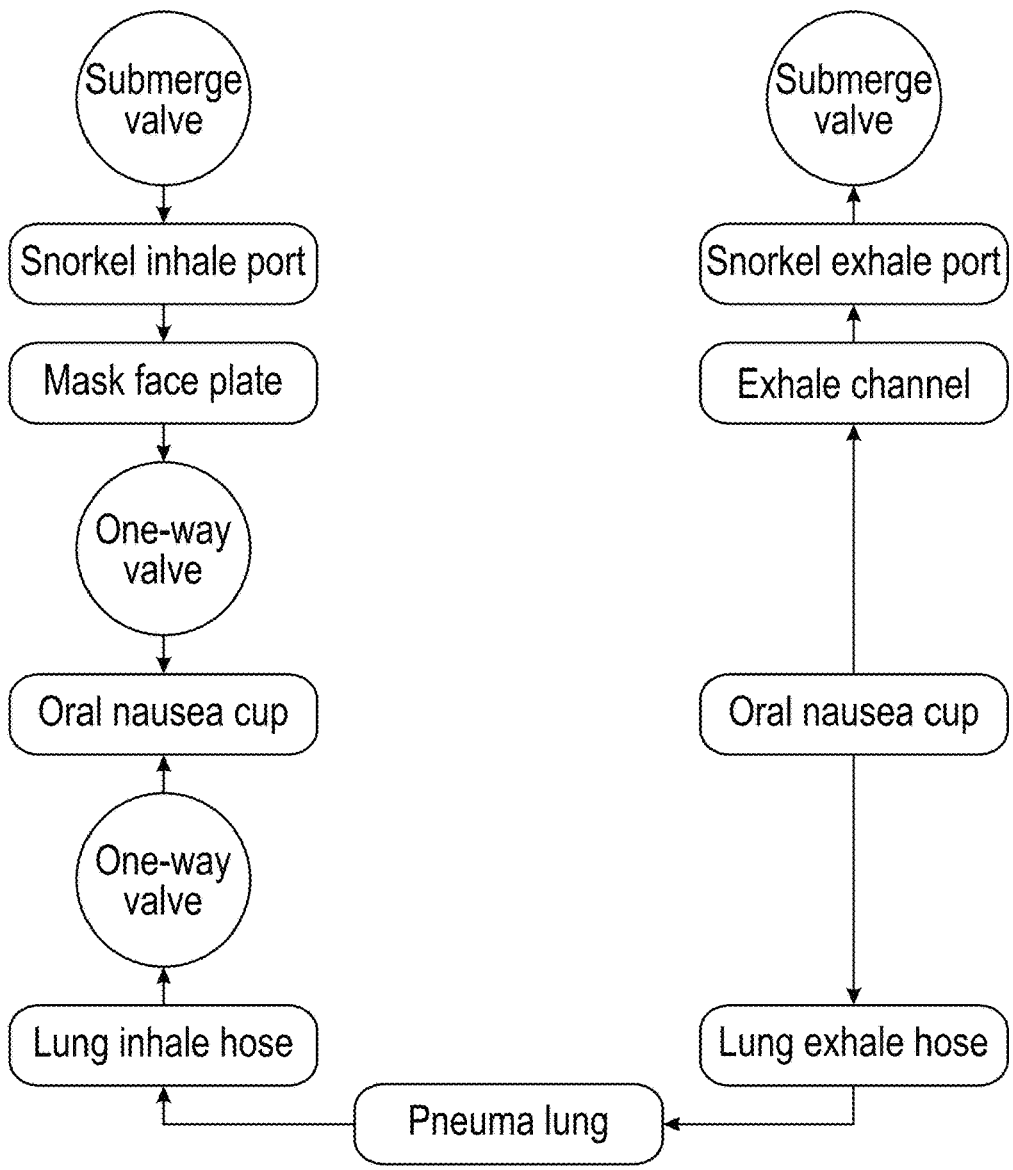
FIG. 5 is a flowchart showing a first aspect of the operation of the virtual reality sports mask system.
Figure 6:
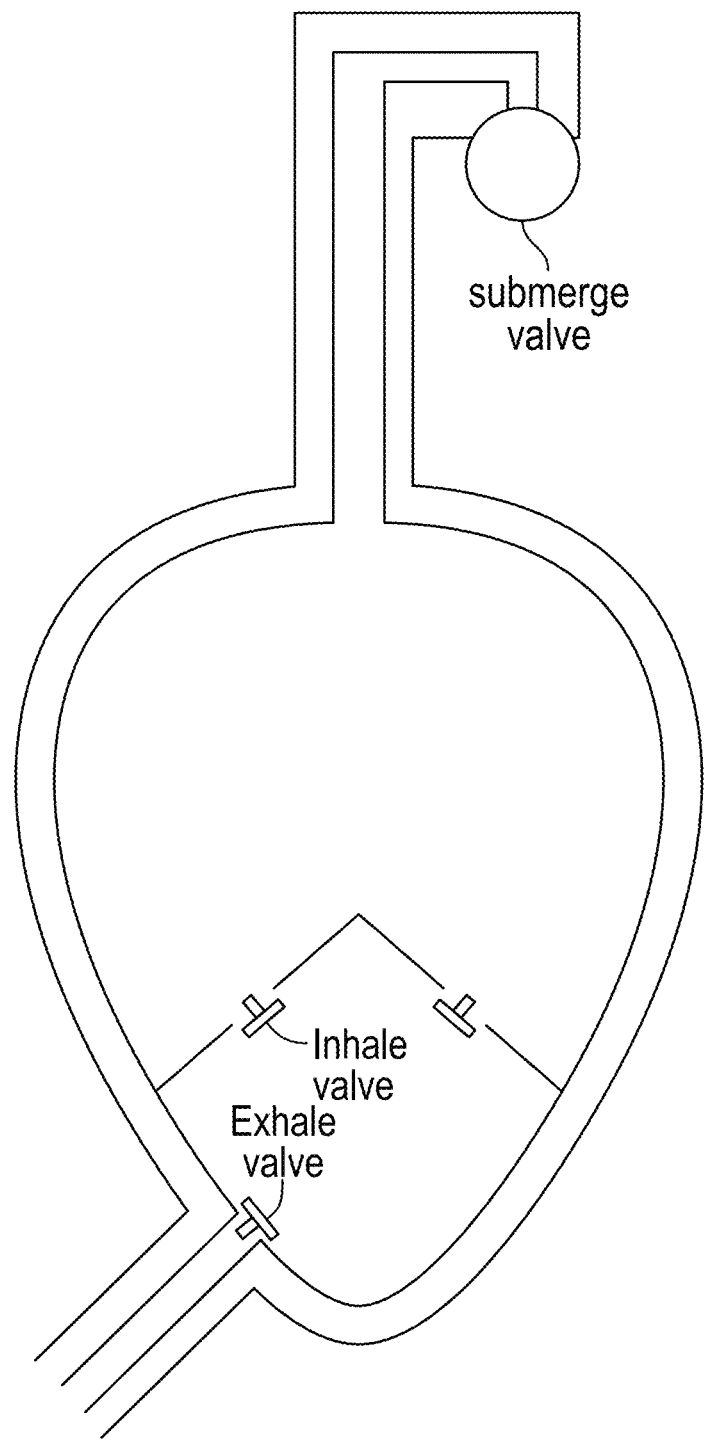
FIG. 6 is a diagram showing gas flow through the virtual reality sports mask system.

An embodiment of the mask has a multi-port, surface-supplied short snorkel to provide surface ambient air to the mask. The snorkel has a mechanical immersion valve to close the ports when the mask is submerged. The snorkel has separate ports for inhale and exhale air to reduce the re-inhalation of exhaled air. Ambient inhale air from the surface flows through the inhale port of the snorkel into the air space between the user's eyes and the lens of the mask, then through one-way valves into the oral nasal cup. This configuration uses the fresh inhale air to help prevent the mask lens from fogging due to condensation on the inside surface of the lens. Exhaled air flows through ports in the side of the oronasal cup up through channels along the side of the mask to the exhale ports of the snorkel (see FIGS. 5 and 6).

A two port coaxial breathing hose nominally of 22 mm and 15 mm diameters is fluid-connected to ports in the oronasal cup of the mask and to the powered snorkel or the Pneuma Lung self-contained underwater breathing apparatus. One hose port of the co-axial assembly is for the inhale gas, with the second hose port for exhale. A one-way mushroom valve prevents exhaled gas from flowing through the inhale hose port.

The Pneuma power snorkel fluid connects to the oronasal cup and provides surface supplied air to the user to a limited depth, currently three meters. The power snorkel has a battery powered variable speed centrifugal compressor which provides surface air to the mask at an appropriate pressure and volume. The current embodiment compressor is direct driven by a permanent magnet synchronous motor and a controller. The controller determines the pressure and volume of breathing air needed and adjusts the speed of the compressor to match the need, this eliminates the need for mechanical pressure regulators, pressure diaphragms or switches.

The Pneuma lung is a self-contained underwater breathing device which enables immersion to depths greater than the power snorkel. The lung contains user replaceable components to enable repetitive dives without the need to refill air tanks. The lung recirculates exhale gas removing excess carbon dioxide and replenishing the oxygen metabolized during the dive. The ambient air snorkel has a mechanical immersion valve to close the snorkel during immersion. Differential air pressure then directs respiration from the snorkel to the underwater breathing unit.

Optical Wireless Communications

An embodiment of the mask has a diffused-light optical transmitter and receiver to enable short distance digital communications with other masks and devices. The absorption effect of pure seawater is introduced from two sources: the water molecules themselves; and dissolved salts in water. Pure seawater is absorptive except around a 400 nm-500 nm window, which is the blue-green region of the visible light spectrum. In order to get the needed optical power, range, and transmission efficiency of the optical signaling, the mask has a circular array of 450 nm chip LED transmitters mounted in an optimal location and position on the mask. One or more Everlight CL15-22C photo detectors are affixed to the outside of the mask in an optimal position and location.

Optical transmission in water creates an abundance of reflections and attenuation which needs to be compensated for. Two different modulation protocols are being implemented each having different features and capabilities.

Figure 7:
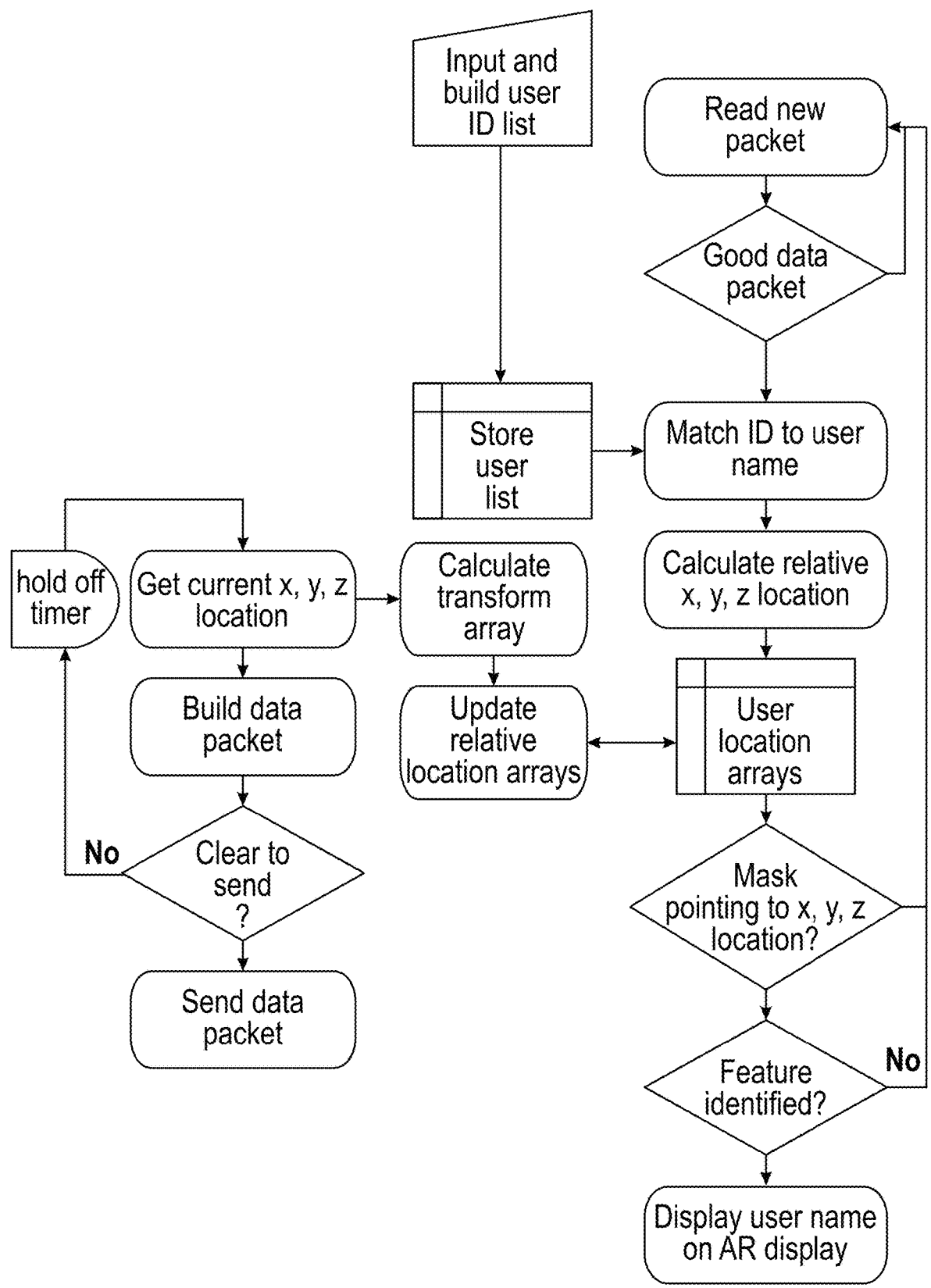
FIG. 7 is a flowchart showing a second aspect of the operation of the virtual reality sports mask system.

In one implementation, data collision avoidance is the preferred method of transmission, as this reduces the filtering and processing power needed to discriminate usable data. In this method, a proprietary promiscuous UDP packet is assembled and transmitted using collision avoidance and random hold-off timing for a transmission attempt. The photo detector circuit attempts to assemble UDP packets using an adaptive sensitivity and clock detection, rejecting any packets with incomplete frames or crc errors. Each transmitter listens for the end of a packet and an inter-packet gap in the transmissions. When no transmission is detected, each transmitter starts a pseudo-random number counter. At the end of the count, the detector again listens for transmission. If negative, the mask transmits its packet—if not, a new counter is started and the process repeats. The packets contain serialized headers, the origin ID, data, and a cyclic redundancy check block. The packets are modulated at a nominal 1 MHz frequency with a range of about 20 meters (see FIG. 7).

In a second method, the mask uses a modified version of the IEEE 802.11 LiFi modulation and protocol standard. In this version, the standard IEEE 802.11 Li-Fi visible light source is replaced with a nominal 450 nm wavelength LED and matching photo receptor. In this configuration, the mask may also communicate with other users, devices, and a smartphone with LiFi capability or having a LiFi adapter. The LiFi standard provides higher bandwidth channel and is able to replace the short range RF transmission between the mask and the smartphone.

Citizen Scientist Sensor Pack

In an embodiment, a removable sensor module is attached to the mask that connects to the mask CPU using a $I^2C$ digital serial interface. The different modules contain sensors for collecting metrics for scientific research. This is the first time an attempt is being made to collect location and time accurate scientific research data through high-volume, mass, crowd-sourcing. The data collected by each mask is transmitted to the smartphone app using the mask RF link, then uploaded for consolidation with other users data. Three sensors may be used to sense (among other things) potential of hydrogen (pH), temperature, and TDS. The current Atlas Scientific pH sensor includes a temperature sensor to calibrate the bias of the sensing electrode. An Atlas Scientific TDS sensor is used to measure salinity.

Video Recording with Localization and Feature Tagging

Figure 8:
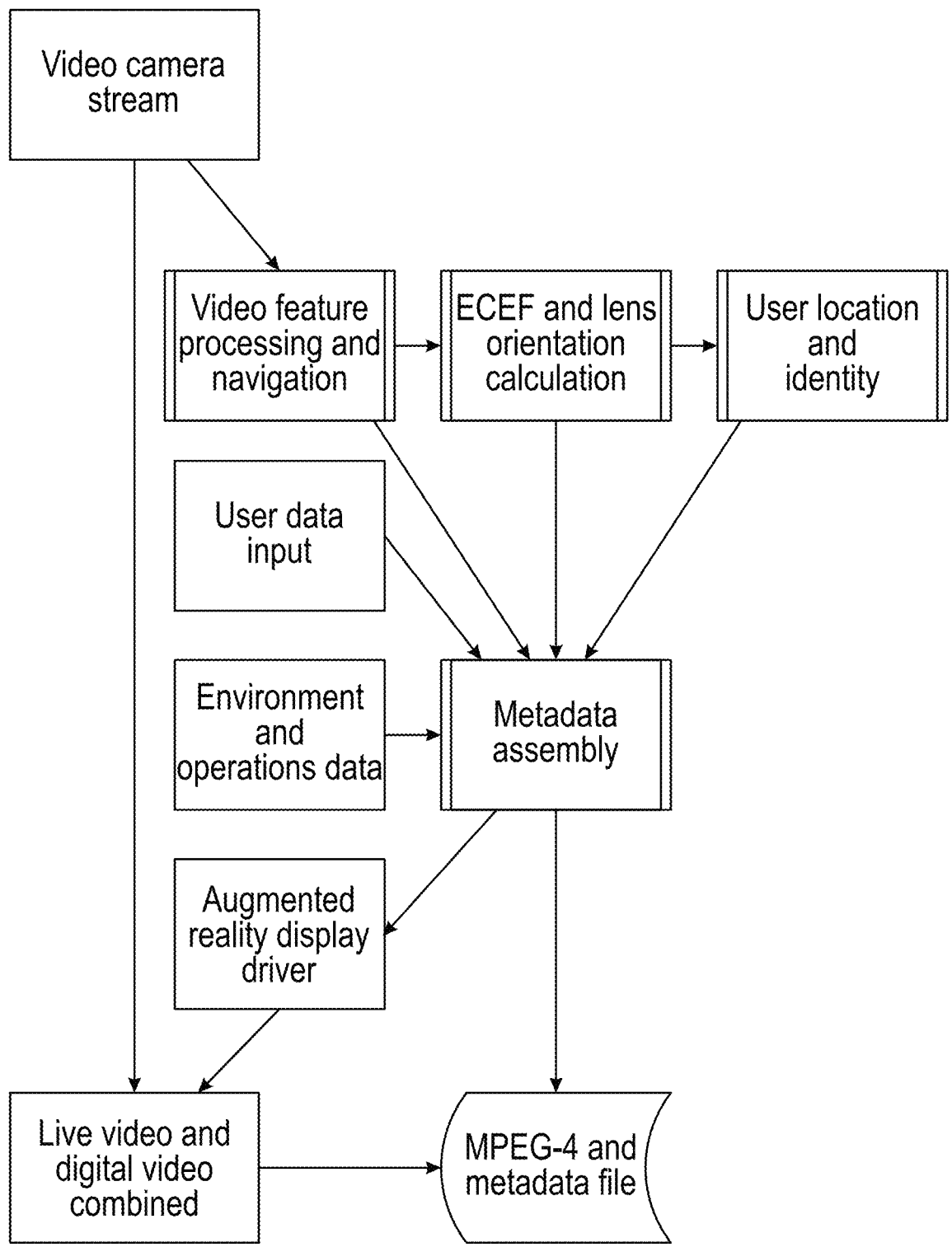
FIG. 8 is a block diagram of a fourth embodiment of a virtual reality sports mask system in accordance with this invention.

In certain embodiments, the video frames from the camera(s) are combined with the digital data displayed on the mask lens, then stored as MPEG-4 compressed video. This as a branch of the same video stream being processed for features recognition and navigation. Part of the Pneuma group social media application suite includes an automated intelligent platform for reducing the video stream into high-interest and high-engaging video content. This automated process performs better if high value sections of video are tagged and identified and if the geographical location is known. For the processing of the video content for 3D or 360 viewing, it is also beneficial to know the location and the orientation of the mask lens. To provide for the features, editing, and localization of the video data, the mask stores additional data with the video stream. This data, in addition to the standard metadata embedded in the MPEG-4 stream, includes the ECEF XYZ location as a 3 by 32 bit array or reals, the 2 by 16 bit array of the azimuth and altitude of the lens, the 32 bit value of current user emoji, and the string of the numeric value of the feature identification (see FIG. 8).

The video stream has MPEG-4 part 14 extensible metadata platform for embedding additional information into the video file. While the extensible metadata platform has provision for a latitude, longitude, and altitude (LLA) packet, this is not sufficient for the mask as discussed prior. Pneuma has extended the XMP structure and xml tags to accommodate the additional data and array size needed.

Virtual Path Following and Destination Guidance

Figure 9:
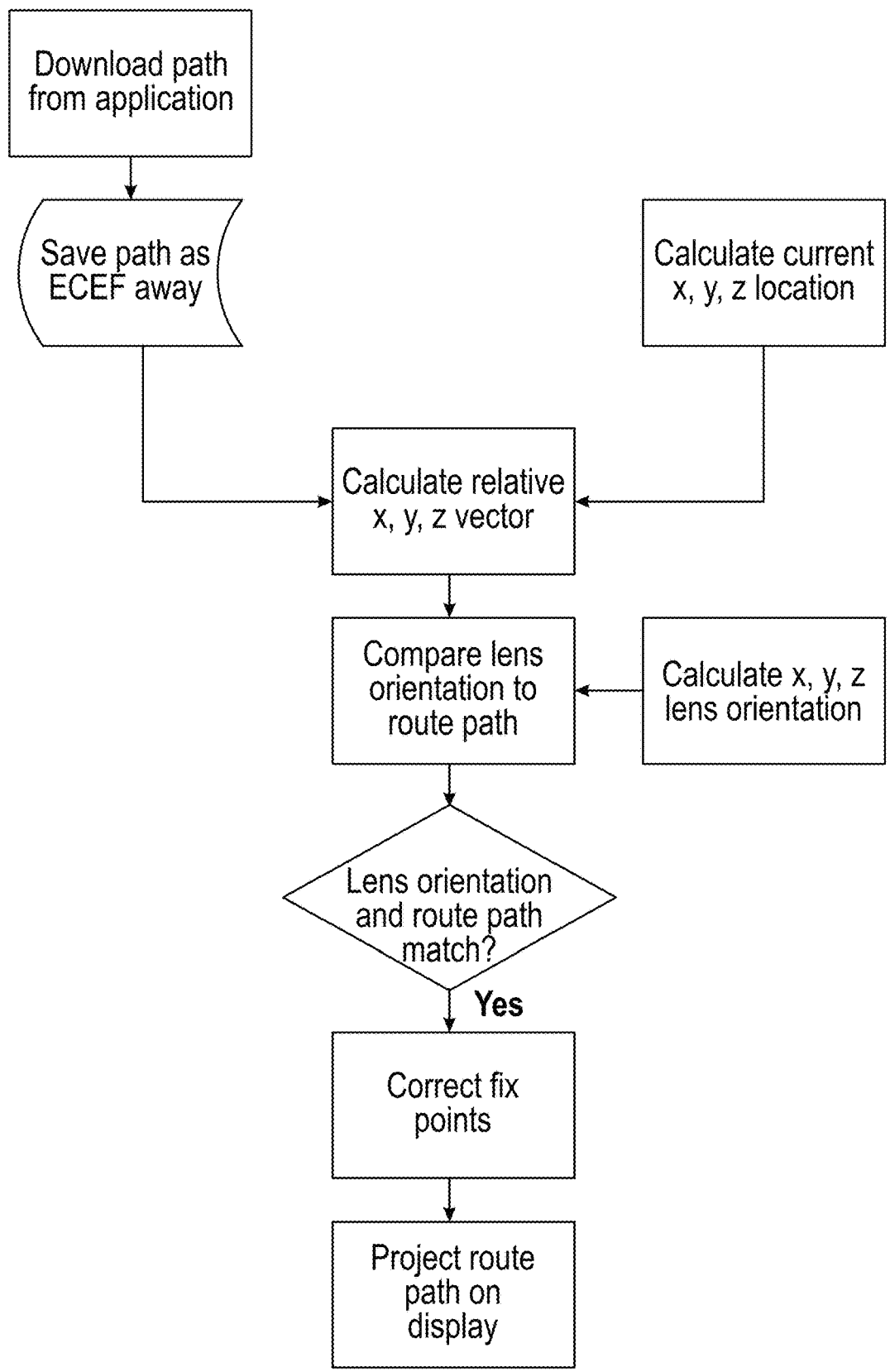
FIG. 9 is a flowchart showing a third aspect of the operation of the virtual reality sports mask system.

The Pneuma smartphone app is able to collect and download to the mask three dimension routes stored as arrays of ECEF X, Y, and Z coordinates. The mask software computes the absolute points of the route, connects the location points, and makes this visual path available to the software. This path is then projected onto the actual features of the real environment giving visual navigation to the destination (see FIG. 9).

In a similar way, target locations can be downloaded from the smartphone app to identify a particular feature or point of interest. The software computes this destination as a relative vector from the mask and provides guidance indicators to the target location.

User Location and Identification

In some embodiments, one of the features of the mask software and hardware is the ability to identify other Pneuma users while in the water. This is done using a combination of building a list of relative coordinates to each user in range of the optical communications, the orientation of the mask lens, and the feature recognition system of the navigation and augmented reality routines.

The software calculates the masks location in centimeter resolution XYZ coordinates. This location, coupled with a user identity value and other data, is broadcast to other devices. When the mask location is in range and the lens is positioned to point in the direction of another user, the vision system attempts to identify the features of the other user. If appropriate features are detected, the mask identifies the features as the user matching the position received from the optical system. The users identity value is converted to the users name, and this is overlaid on the display.

Figure 10:
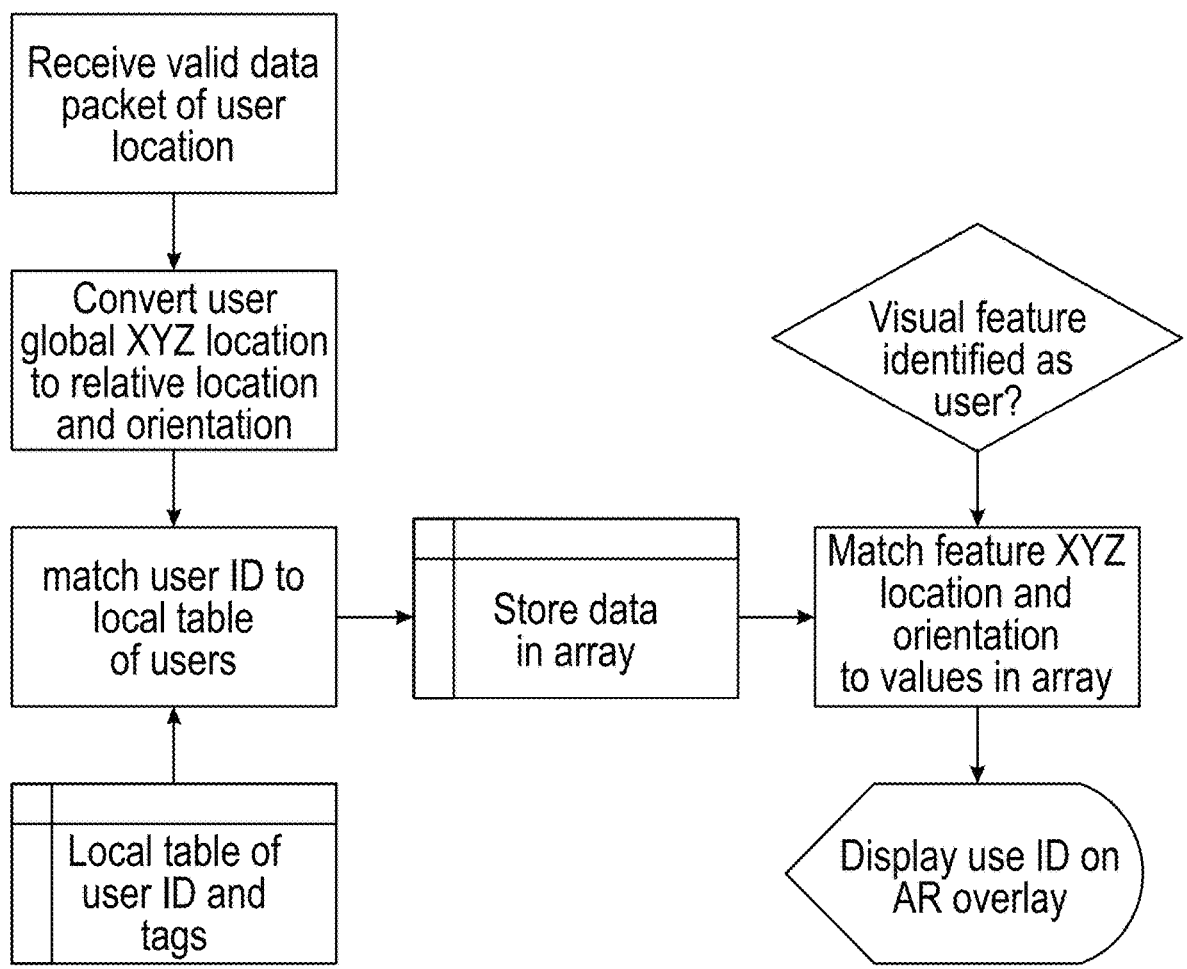
FIG. 10 is a flowchart showing a fourth aspect of the operation of the virtual reality sports mask system.
Figure 11:
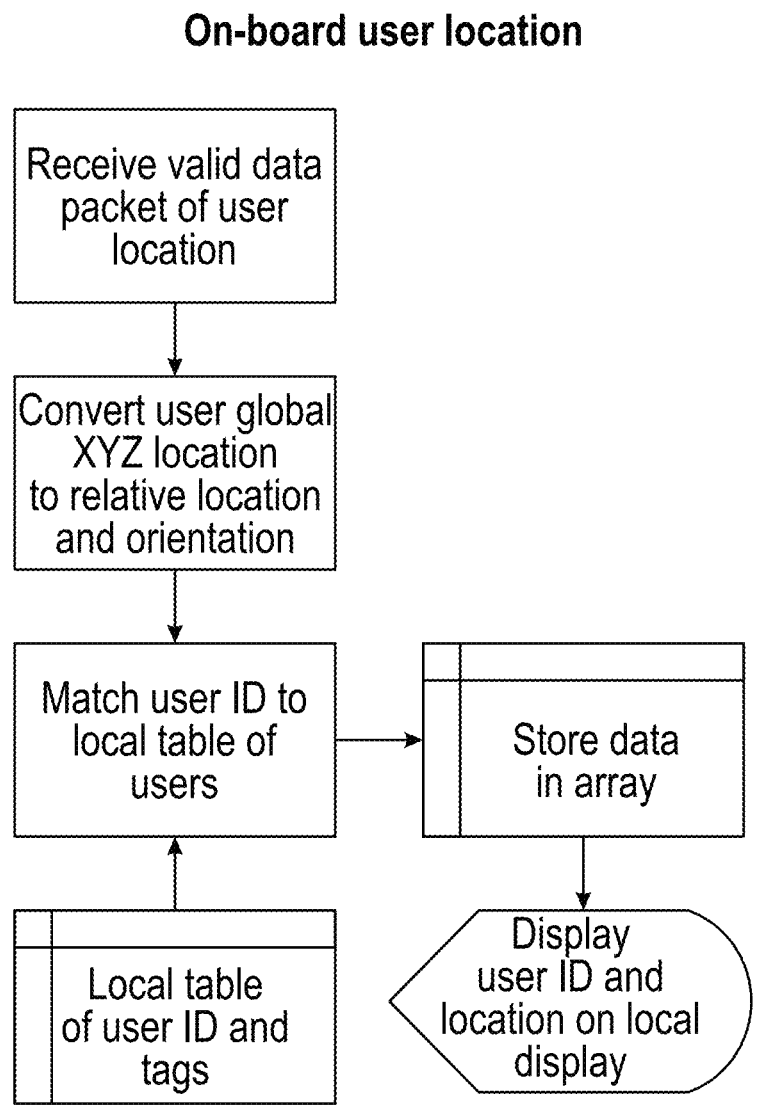
FIG. 11 is a flowchart showing a fifth aspect of the operation of the virtual reality sports mask system.

Each user of the mask has a unique identity code assigned to them when they register with the application suite. This ID code is also used to activate the mask and unlock some functions of the software. The optical communications system broadcasts each masks locations, the user ID code, and other data. When in optical communication range, the mask builds lists of the relative location of each in range user. If the lens orientation is in the general direction of another user, the vision system attempts to identify a feature set consistent with the person. If this feature identification correlates with the location of the other use, then the ID code is used to find the user name. The name is then displayed on the screen over the identified features. If enabled, the emoji recording system is able to include the present emoji in the data stream, and this information is included in the display (see FIGS. 10 and 11).

When the LiFi system is included in the mask and the other user is in optimal optical communication range, voice communication is also possible between users. The mask implements Media gateway Control Protocol (MGCP) over the IEEE 802.11 transport and is able to initiate and conduct point-to-point and multi-point connections. The location and ID data of each mask is broadcast with the user ID identifying a user only if the user has given permission to publish their ID. A matching receiver on a vessel in range will also receive the location and ID of each user. This information could be used by a vessel to track the location and ID of the users on that vessel.

Navigation System

A technology feature of the certain embodiments of the mask is the underwater navigations system, which uses radio GPS navigation on the surface to establish a known WGS84 LLA location, magnetic sensors to determine azimuth, a three axis inertia/gyroscope Inertia Management Unit (IMU) to determine acceleration and rotational movement, and visual feature detection to compute relative 3D movement velocities.

The MEMS IMU sensors uses the same principles as mechanical accelerometers/gyros and have similar results, the difference being that MEMS are implemented in a silicon chip, thus being smaller, lighter, and less power consuming. Unfortunately MEMS IMU's are less accurate than the more expensive mechanical or optical accelerometers and gyroscopes.

Figure 12:
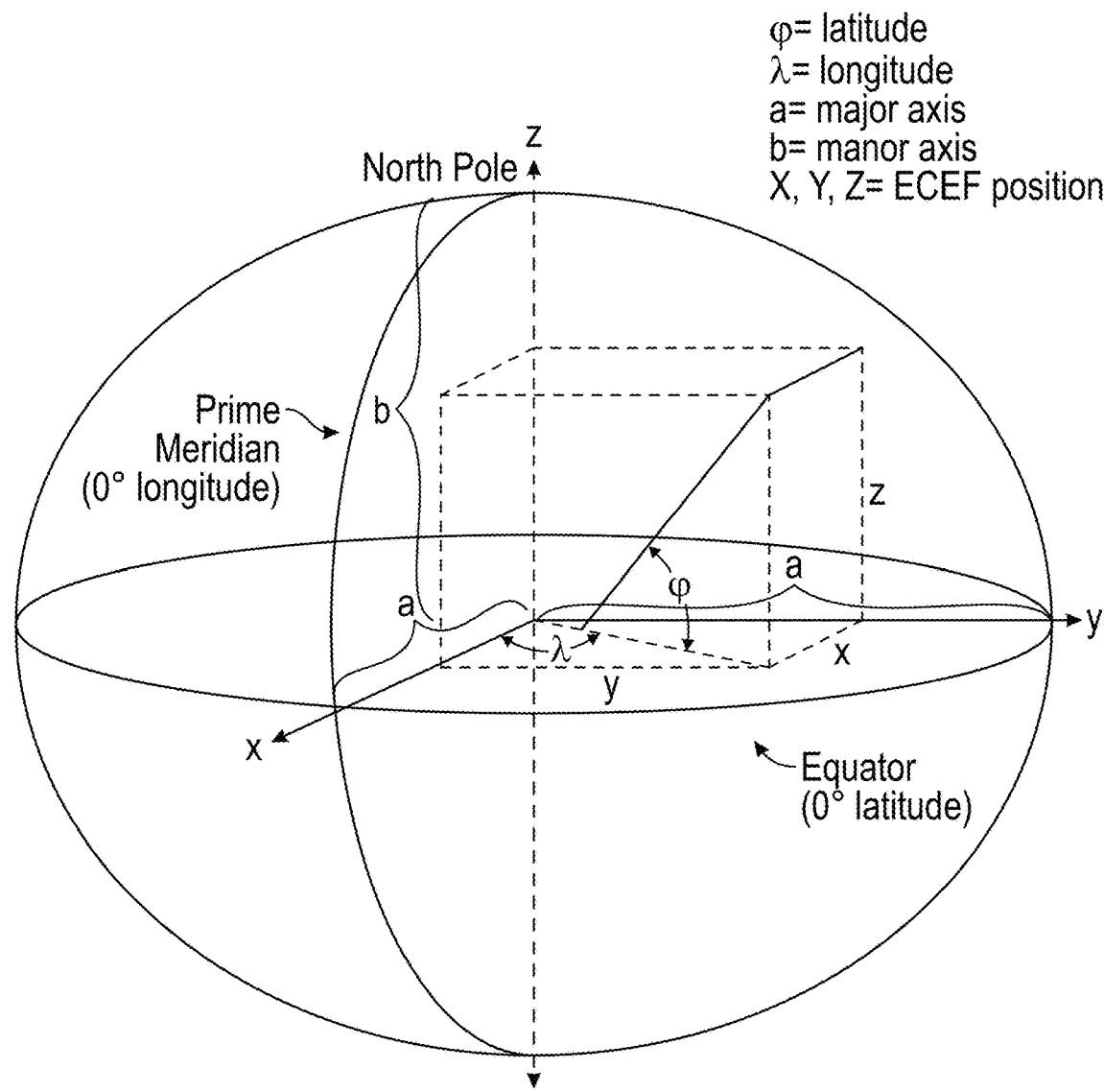
FIG. 12 is a schematic view of a global positioning system.

The GPS provides position data when available and the mask is on the surface. Once the mask submerges and the GPS signal is lost the IMU, magnetic and vision camera take over all navigation and position calculations. The camera seeks features and edges from any underwater shape, including smooth white sand, and the software calculates a relative XYZ 3D vector from the movement difference from frames of the video. Localization using image feature detection provides accurate linear movement approximation, but tends to be inaccurate with respect to turns and other rotational movement. Conversely, the IMU provides accurate rotational movement, but falls short in prolonged linear movement approximations due to the compounded accelerometer error of the low cost MEMS sensors and low acceleration environment drift. Much better 3D movement vectors are obtained by combining the respective strength of the 3D vectors of the vision feature detection and the 3D vectors of the IMU, then combined with a magnetic azimuth. This relative XYZ location is then calibrated to a global ECEF and WGS84 LLA location (see FIG. 12).

The mask finds its WGS84 geographical location based on a GPS read prior to and after the dive. However, this will not provide accurate azimuth. The magnetic three axis magnetometer provides an accurate magnetic azimuth, which then needs to be corrected for local deviation. Once underwater, the GPS signal is lost so no further latitude and longitude information is provided. The underwater navigation needs to be accurate in three dimensions, so even if GPS were to work, it would not be suitable. The three-axis IMU sensors then provide the angular direction and velocities needed to compute inertia 3D vectors. However, the MEMS IMU sensors do not provide the needed accuracy and have excessive drift. The image from the camera(s) is then used to capture the surrounding environment with frame over frame analysis of feature and edge detection and movement. Clusters of frames are filtered, processed, and evaluated for relative movement of the features. If movement is detected, the relative 3D XYZ movement vectors are calculated.

The magnetometer establishes azimuth, then corrects the gyroscopes for drift and other errors. The combination of the magnetometer, the three axis IMU data, and the three axis vectors of the image features detection are combined to form an enhanced relative ECEF XYZ coordinate array. This ECEF array is enhanced to carry the earth center distance in one centimeter resolution, rather than the standard one meter. Prior to immersion and post immersion, the GPS receiver establishes a WGS84 latitude, longitude, and altitude (LLA) fix. This is converted to an enhanced ECEF array and combined with the relative arrays of the sensors to create an absolute global ECEF set of values. After the activity, the array of relative or absolute ECEF values are converted to WGS84 LLA for posting to web and map applications.

The mask camera can be singular or stereoscopic. To extract depth information from a single camera, two separate frames are used, with the assumption that the camera will have moved in the time between the frames. Features that are found in both images are then used as match points, with the camera movement used as the baseline. The benefit of using a single camera is less hardware, reducing system size, cost, and hardware complexity. Additionally, there is no need to calibrate two cameras to work together. Stereo cameras use two cameras placed at the nominal ocular distance in the mask. They are used to determine depth information for each frame by matching features that both cameras can see, then watching as the points move in space relative to the cameras as the cameras move. The addition of the second camera makes this method superior to mono-camera vision, as the depth of each of the points of interest can be found in each frame, as opposed to waiting for the camera to move to provide perspective. Stereo feature detection can work from just one frame to the next, or a sliding window of frames could be used to potentially improve accuracy. Stereo feature detection requires more hardware than monocular visual odometry. It also has increased accuracy and requires somewhat less complexity for the computation.

Each frame is captured, then stored as a video image and processed for features. Once features have been detected, they are matched to the image frames from the previous time step. Once features have been matched, the platform's motion is reconstructed using random sample consensus. This takes a small number of randomly selected, successfully matched features and forms a hypothesis of the system's motion based on these features. This hypothesis is then tested against other successfully matched features and, if enough points fit, it is accepted as the motion of the system. If the test fails, a new hypothesis is formed with a different set of points. The accuracy of the motion reconstruction ultimately depends on the number of matched features found. Simultaneously, the inertia acceleration and magnetic heading data is measured by the sensors. The acceleration data from the inertia sensors is converted to the relative XYZ frame through a matrix describing the orientation of the device relative to its starting orientation integrated to estimated Euler angles. This data array is integrated with the known latitude, longitude, altitude, and azimuth to determine the current position of the user.

Figure 13:
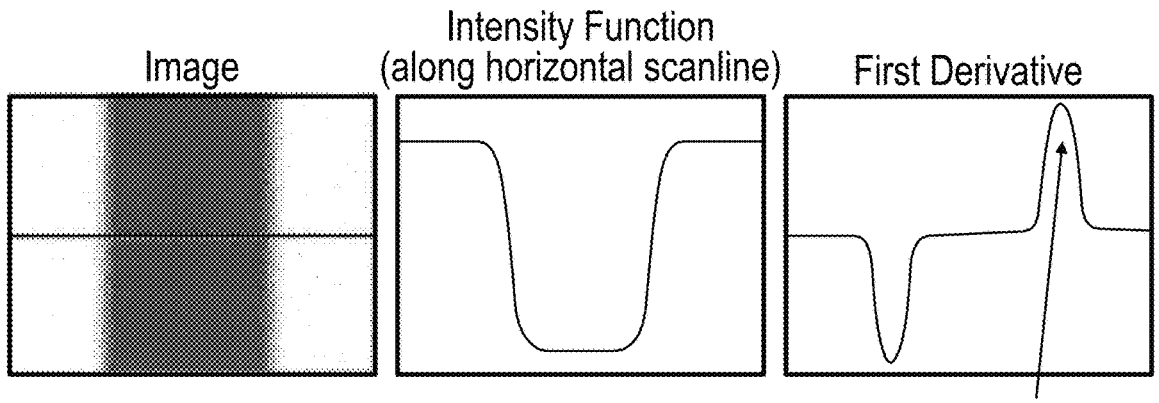
FIG. 13 illustrates an exemplary image, an intensity function, and a first derivative that may be generated by the system of this invention.

Feature matching and detection involves the location, extraction, and matching of unique features between two or more distinct images. Feature detection is a general term that includes algorithms for detecting a variety of distinct image features. These algorithms can be specialized to detect edges, corner points, or other unique features. Edge detection is used to convert a two-dimensional image into a set of curves. An edge is a place of rapid change in the image intensity. In order to detect an edge, discrete derivatives of the intensity function need to be derived such that we might get the image gradient (see FIG. 13).

Figure 14:
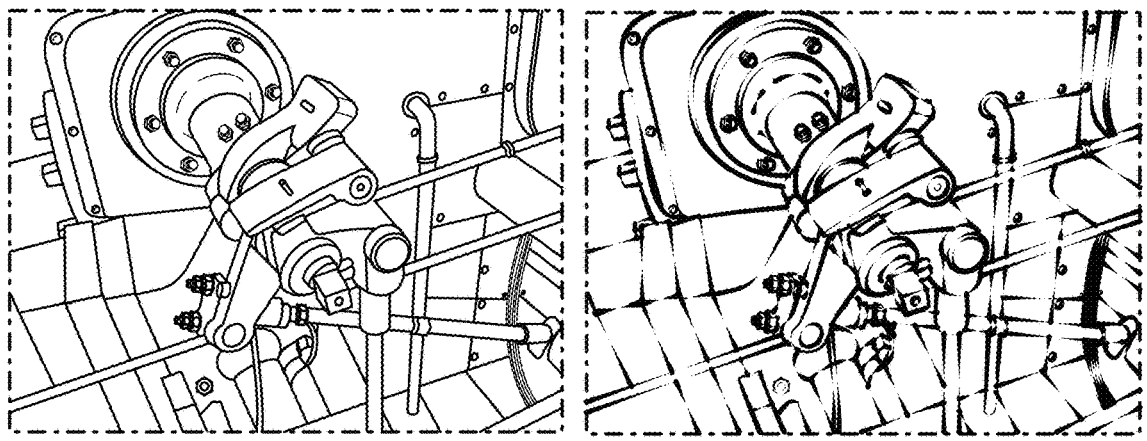
FIG. 14 are perspective views of another aspect of the system of this invention.

The images have noise associated with the edges and must first be smoothed using an image Gaussian filter. Common edge detection algorithms include the Sobel method, Prewitt method, Roberts method, Laplacian of Gaussian method, zero-cross method, and the Canny method. The Sobel method finds edges using Sobel approximation derivatives. Similarly, the Prewitt and Roberts methods find edges using their respective derivatives of the Sobel. The Laplacian of Gaussians method finds edges by filtering an image with a Laplacian of Gaussian filter, and then looking for the zero crossings. The zero-cross method is similar to the Laplacian of Gaussian method, with the exception that filter on the image can be specified. The Canny method finds edges by looking for local maxima of the gradient of the image, wherein that gradient is then calculated using the derivative of a Gaussian filter (see FIG. 14).

Figure 15:
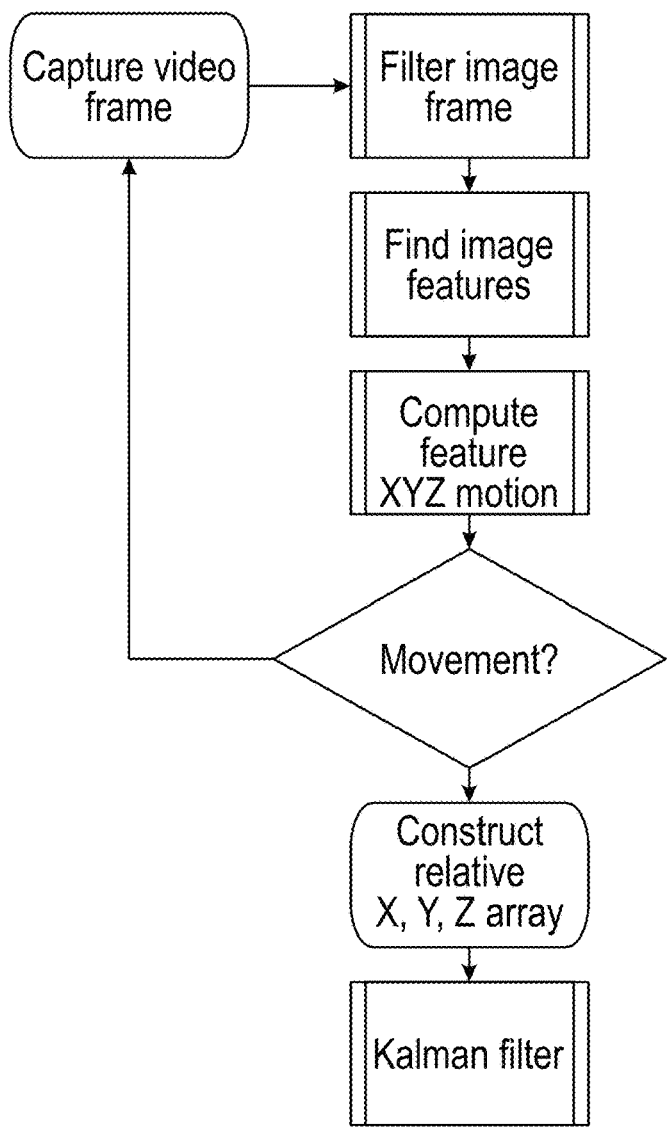
FIG. 15 is a flowchart showing a sixth aspect of the operation of the virtual reality sports mask system.

Once features have been located in a frame, they must be matched to features in preceding frames in order to find a hypothesis for the motion of the camera. Random sample consensus is an iterative method to estimate parameters of a mathematical model from a set of observed data which contains outliers, and it is used to remove false feature matches. Feature detecting algorithms find and extract interesting feature points from the images. These feature points are then matched between the two images preceding them. The algorithms provide local x and y coordinates from the 2D images. For this information to actually be relevant, it needs to be interpolated as 3D coordinates. By obtaining the 3D coordinates, we measure the magnitude and direction by which the features changed from the current image to the one preceding it and, consequently, determine the change in motion of the mask (see FIG. 15).

Each axis of the MEMS IMU has two effective sensors, an accelerometer and a gyroscope, to collect acceleration and angular velocity measurements. The accelerometers measure inertial forces that are directed in the opposite direction from the acceleration vector. The accelerometer data consists of X, Y, and Z measurements that can be used to calculate velocity and position through integration. The gyroscope data consists of the change in roll, pitch, and yaw, which is the angle of rotation about the X, Y, and Z axes respectively.

The angular velocity can be used to track the angular heading of the system augmented and calibrated by the magnetometers. Gyroscopes have a static bias, which is the signal output from gyro when it is not experiencing any rotation. Gyroscopes also have bias that varies with temperature and time called bias drift. Gyroscopes provide reasonable estimations of turns over a short period of time. However, the position computed using accelerometer data drifts very quickly due to the cubing of measurement error. This is why we use the magnetometers to establish azimuth and to periodically remove the bias and drift error.

Figure 16:
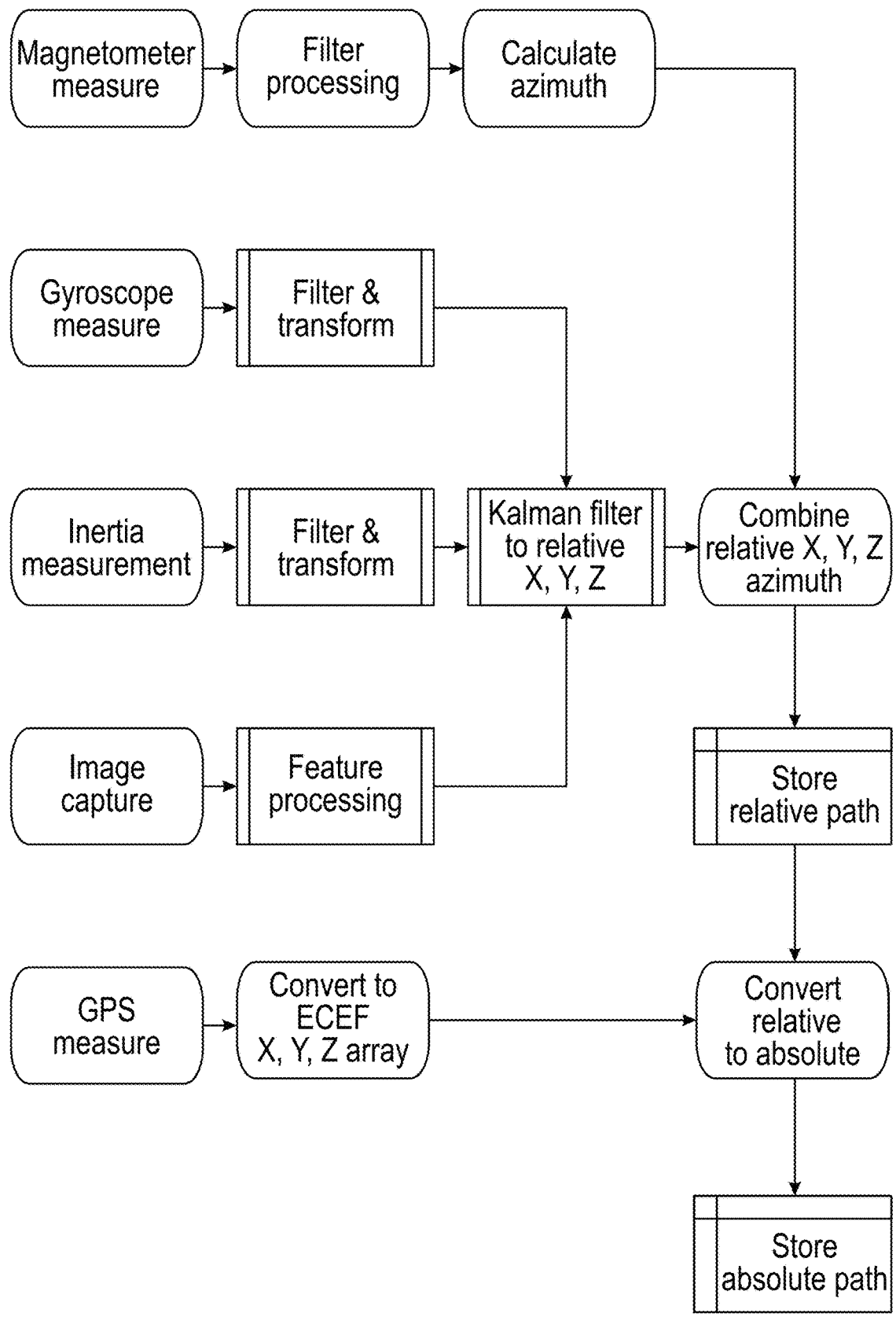
FIG. 16 is a flowchart showing a seventh aspect of the operation of the virtual reality sports mask system.

Kalman filters are widely used algorithms that use noisy data and a dynamic model to produce estimations of the unknown variables that describe a system's current state. The mask's implementation of Kalman filters are algorithms that use a series of measurements observed over time containing statistical noise and other inaccuracies. The results of the filters produce estimates of the unknown image feature variables that tend to be more accurate than those based on a single measurement alone by estimating a joint probability distribution over the variables for each timeframe. The Kalman filter produces a recursive estimation that minimizes the mean of the square error of both the inertia and vision sensor results. Application of time variance in the matrices in the Kalman filter allows the vision feature detection and IMU sensors to receive high or low priority, depending on which sensor is providing more accurate data at the given time. The Kalman filter then combines the biased 3D vectors from vision feature detection and the biased 3D vectors from the IMU to arrive at a very accurate underwater 3D position fix. Each fix is then recorded as an array of XYZ and azimuth, which is then converted to latitude, longitude, and altitude (depth) (see FIG. 16).

The software in the mask maintains a set of array fixes recording the path the user is taking. This set of arrays is made of the relative XYZ and azimuth values computed along the path of motion. One or more other sets of arrays may also exist as guide paths for the activities. One or more target arrays may also exist to guide the user to specific features and locations. Arrays of fixes are converted as needed between WGS841LLA, real ECEF arrays, and relative ECEF arrays.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A snorkeling and/or scuba diving sports mask for use in providing a visual navigation in an underwater environment comprising:
    a head support structure that is adapted to be connected to or supported on a head of a user in a watertight manner in an underwater environment;
    a lens that is supported on the head support structure and is sufficiently transparent to allow the user to see therethrough into a real world underwater environment; and
    a system that is structured and configured to:
    (1) capture one or more images of one or more visual features from the real world underwater environment;
    (2) identify the one or more visual features from the real world underwater environment using the one or more captured images;
    (3) calculate a path through the real world underwater environment based upon the one or more identified features from the real world underwater environment and/or from one or more stored routes; and
    (4) project the calculated path onto the lens and overlying the actual features of the real world underwater environment to provide a visual navigation to the user in the real world underwater environment.

2. The sports mask defined in claim 1 wherein the head support structure is a portion of a snorkel.

3. The sports mask defined in claim 1 wherein the head support structure is a portion of a scuba unit.

4. The sports mask defined in claim 1 wherein the head support structure is a portion of a full face sports mask.

5. The sports mask defined in claim 1, wherein the system is structured and configured to collect location, orientation, and visual information from the real world underwater environment, calculate the path through the real world underwater environment based upon the current location, orientation, and visual information from the real world underwater environment, and project the projected path as a translucent image onto the lens in orientation of a line-of-sight of the user.

6. The sports mask defined in claim 1 wherein the system is structured and configured to calculate an enhanced relative earth-centered, earth-fixed, three-dimension location fix that is calibrated to absolute earth-centered, earth-fixed coordinates and to project that location fix onto the lens.

7. The sports mask defined in claim 6 wherein the system is structure and configured to additionally calculate an orientation of a line-of-sight lens of the user relative to the location of the sports mask in two axis of azimuth and altitude and to project that orientation onto the lens.

8. The sports mask defined in claim 1 wherein the system is structured and configured to identify the one or more visual features from the real world underwater environment using detected and extracted edges and features from the real world underwater environment.

9. The sports mask defined in claim 8, wherein the system is structured and configured to calculate the path through the real world underwater environment by computing three dimension vectors based on changes in the movement of the features from the real world underwater environment.

10. A snorkeling and/or scuba diving sports mask for use in providing a visual navigation in an underwater environment comprising:
    a head support structure that is adapted to be connected to or supported on a head of a user in a watertight manner in an underwater environment, wherein the head support structure is a portion of a snorkel, scuba unit, or full face sports mask;
    a lens that is supported on the head support structure and is sufficiently transparent to allow the user to see therethrough into a real world underwater environment; and
    a system that is structured and configure to:
    (1) capture one or more images of one or more visual features from the real world underwater environment;
    (2) identify the one or more visual features from the real world underwater environment using the one or more captured images;
    (3) calculate a path throught the real world underwater environment based upon the one or more identified features from the real world underwater environment and/or from one or more stored routes; and
    (4) project the calculated path onto the lens and overlying the actual features of the real world underwater environment as a translucent image onto the lens in orientation of a line-of-sight of the user to provide a visual navigation to the user in the real world underwater environment.

11. A sports mask defined in claim 10 wherein the system is structured and configured to calculate an enhanced relative earth-centered, earth-fixed, three-dimension location fix that is calibrated to absolute earth-centered, earth-fixed coordinates and to project that location fix onto the lens.

12. A sports mask defined in claim 11, wherein the system is structured and configured to additionally calculate an orientation of a line-of-sight lens of the user relative to the location of the sports mask in two axis of azimuth and altitude and to project that orientation onto the lens.

13. The sports mask defined in claim 10, wherein the system is structured and configured to identify the one or more visual features from the real world underwater environment using detected and extracted edges and features from the real world underwater environment.

14. The sports mask defined in claim 13, wherein the system is structured and configured to calculate the path through the real world underwater environment by computing three dimension vectors based on changes in the movement of the features from the real world underwater environment.

* * * * *